(12) United States Patent
Zinn (10) Patent No.: US 7,374,669 B2
(45) Date of Patent: May 20, 2008

(54) VACUUM WASTE REMOVAL SYSTEM (75) Inventor: Thomas K. Zinn, Chino, CA (US)

(73) Assignee: Acorn Engineering Co., City of Industry, CA (US)

( * ) Notice: Subject to any disclaimer, the term of this patent is extended or adjusted under 35 U.S.C. 154(b) by 337 days.

(21) Appl. No.: 11/114,458

(22) Filed: Apr. 26, 2005

(65) Prior Publication Data
US 2006/0237373 A1 Oct. 26, 2006

(51) Int. Cl.
B01D 21/30 (2006.01)
C02F 1/02 (2006.01)

(52) U.S. Cl. ..................... 210/138; 210/181

(58) Field of Classification Search .......... 210/703, 210/744, 138, 181
See application file for complete search history.

(56) References Cited

U.S. PATENT DOCUMENTS

| 3,239,849 | A |   | 3/1966  | Liljendahl |         |
|-----------|---|---|---------|------------|---------|
| 3,628,194 | A |   | 12/1971 | Liljendahl |         |
| 3,686,693 | A |   | 8/1972  | Liljendahl |         |
| 3,746,032 | A |   | 7/1973  | Wallgren   |         |
| 4,179,371 | A |   | 12/1979 | Foreman et al. |     |
| 4,188,968 | A |   | 2/1980  | Trobaugh et al. |    |
| 4,373,838 | A |   | 2/1983  | Foreman et al. |     |
| 5,100,266 | A |   | 3/1992  | Ushitora et al. |    |
| 5,114,280 | A |   | 5/1992  | Ushitora et al. |    |
| 5,178,754 | A | * | 1/1993  | Batten et al. | 210/138 |
| 5,507,954 | A | * | 4/1996  | Carrillo | 210/703 |
| 5,588,458 | A |   | 12/1996 | Ushitora et al. |    |
| 5,673,723 | A |   | 10/1997 | Roediger   |         |
| 5,871,027 | A |   | 2/1999  | Shimizu et al. |     |
| 6,305,403 | B1|   | 10/2001 | von Palffy et al. |  |
| 6,315,524 | B1| * | 11/2001 | Muhs et al. | 417/199.2 |
| 6,372,129 | B1| * | 4/2002  | Moody | 210/181 |

OTHER PUBLICATIONS

Acorn Vac; Vacuum Plumbing Systems-Benefits: Vacuum in Supermarkets; website http://www.acornvac.com/Supermarkets/supermktvac-benefits.htm; 1 page; copyright 2002-AcornVac. Inc.
Jay R. Smith Mfg.Co.; Grease Interceptors (8000 Series); website http://www.jrsmith.com/products/inter/gi8000.htm;Apr. 12, 2004; 6 pages.
Acorn Vac; Vacuum Plumbing Systems-Supermarkets; website Http://www.acornvac.com/Supermarkets/supermarkets.htm; Apr. 12, 2004; 9 pages.

(Continued)

Primary Examiner—Walter D. Griffin
Assistant Examiner—Tamiko Toye
(74) Attorney, Agent, or Firm—Michael Best & Friedrich LLP (57) ABSTRACT A vacuum transport system suited to moving FOG-laden water. The system includes a first reservoir and at least one vacuum pump in fluid communication with the first reservoir and operable to produce a vacuum within the first reservoir. A first accumulator is positioned to collect FOG-laden water from a first FOG-laden water source. A first valve is operable to selectively provide fluid communication between the first accumulator and the first reservoir. FOG-laden water can be drained from the first reservoir into a grease interceptor disposed in the building exterior.

15 Claims, 4 Drawing Sheets

OTHER PUBLICATIONS

Acorn Vac; Vacuum Plumbing Systems; Frequently Asked Questions; website http://www.acornvac.com/faq.htm; Apr. 12, 2004; 6 pages.

Acorn Vac; Vacuum Plumbing Systems; Acorn Vac Features-Vacuum in Supermarkets; What Makes the AcornVac Vacuum Center Unique?; website http://www.acornvac.com/Supermarkets/supermktvac-features.htm; Apr. 12, 2004; 3 pages.

Acorn Vac; Vacuum Plumbing Systems; condensate Waste Water Collection for Supermarkets, Convenience Stores, Dellicatessens; Information Brochure; at least as early as Apr. 12, 2004; 4 pages; Acorn Vac, Inc.; Chino, CA.

* cited by examiner

VACUUM WASTE REMOVAL SYSTEM

BACKGROUND

The present invention relates to a system and method for draining waste in a plumbing system. More particularly, the present invention relates to a system and method for draining gray water waste and FOG-laden waste in a plumbing system using a vacuum system.

Wastewater is generally grouped into one of several classifications based on the contaminant contained within the water. Gray water generally includes water that drains through floor drains, food preparation sinks, and the like. FOG-laden water generally includes contaminates that are often referred to as FOG (fats, oil, and grease). Generally, gray water can be directed to a sewer or septic system without additional treatment. FOG-laden water is generally treated to remove some or all of the FOG before it is directed to the sewer or septic system.

Various types of drainage systems are used to direct waste from a source, or a plurality of sources, to a common collection point. For example, gravity feed systems are commonly used in residential and commercial buildings to direct waste to the desired collection point. In gravity drain systems, gravity provides the motive force to move the waste from the source(s) to the collection point. Because gravity is the main motive force, the pipes between the source(s) and the collection point must slope down toward the collection point to maintain the desired flow. However, as the pipes of a gravity system become worn, corroded, roughened, or clogged, gravity alone is sometimes insufficient to move the waste. The requirement that the pipes slope also requires careful planing prior to, and during the construction of a building to assure that the pipes are properly located. This extensive pre-planning makes the addition of pipes or new sources to a completed building difficult. For example, if a store owner wished to move a source of waste water (e.g., clear waste, condensate, gray waste, and the like) from a first location to a second location, drain pipes would have to be positioned in the floor beneath the second location. This may require demolition of the floor, closure of the store, and other activities that are inconvenient and perhaps unsafe.

Vacuum drainage systems offer an alternative to gravity systems. Vacuum systems use a combination of gravity and vacuum to draw waste from the source, or sources, to a collection point. Because the main motive force is vacuum (pressure) rather than gravity, the orientation of the pipes is less significant to the operation of the unit. As such, pipes can be positioned above the source of waste if desired.

SUMMARY

The present invention provides a vacuum transport system suited to moving FOG-laden water. The system includes a first reservoir and at least one vacuum pump in fluid communication with the first reservoir and operable to produce a vacuum within the first reservoir. A first accumulator is positioned to collect FOG-laden water from a first FOG-laden water source. A first valve is operable to selectively provide fluid communication between the first accumulator and the first reservoir.

The invention also provides a vacuum transport system suited to moving FOG-laden water. The system includes a first reservoir, a second reservoir, and at least one vacuum pump in fluid communication with the first reservoir and the second reservoir and operable to produce a vacuum within the first reservoir and the second reservoir. A first accumulator is positioned to collect FOG-laden water from a first FOG-laden water source and a second accumulator is positioned to collect waste water from a first waste water source. A first valve is operable to selectively provide fluid communication between the first accumulator and the first reservoir. A second valve is operable to selectively provide fluid communication between the second accumulator and the second reservoir. The first reservoir and the second reservoir are arranged to inhibit the flow of FOG-laden water to the second reservoir.

The invention also provides a method of moving FOG-laden water. The method includes providing a first collection tank, maintaining the pressure within the first collection tank below a vacuum pressure, and exposing a source of FOG-laden water to the vacuum pressure to draw the FOG-laden water into the first collection tank. The method also includes passing the FOG-laden water through a filter to extract a portion of the FOG. This filter can be a grease interceptor disposed in the building exterior.

BRIEF DESCRIPTION OF THE DRAWINGS

The description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
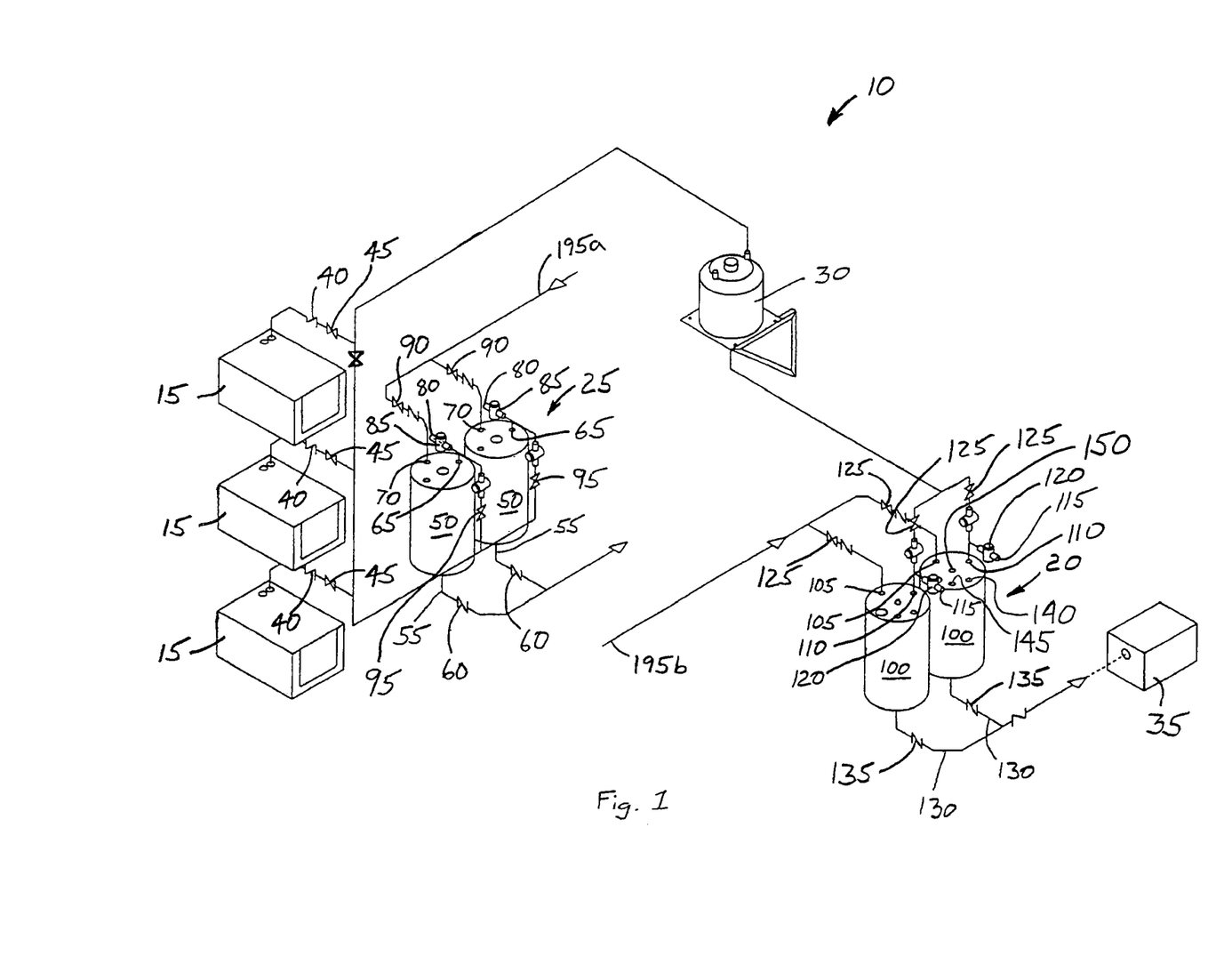
FIG. 1 is a diagrammatic view of a portion of the vacuum drainage system including FOG-laden water collection tanks and gray water collection tanks.

With reference to FIG. 1, a storage portion 10 of a vacuum drainage system suited for use in collecting waste. In one example, a portion of the system 10 is located within a building or store, such as a grocery store. The storage portion 10 includes several vacuum pumps 15, a FOG-laden water reservoir 20, a gray water reservoir 25, a knockdown tank 30, and a grease filter or interceptor 35. A network of pipes and valves interconnect the various components such that the vacuum pumps 15 are in fluid communication with the FOG-laden water reservoir 20, the gray water reservoir 25, and the knockdown tank 30. It should be noted that the illustrated system 10 is arranged to collect two different types of waste (e.g., FOG, gray water, etc.). Other arrangements may collect only one type of waste and thus include only one reservoir 20 or may collect three or more different types of waste, thus including three or more reservoirs.

Before proceeding, it should be noted that the term gray water is used herein to refer to water that may contain impurities other than those that would fall within the definition of FOG (i.e., fat, oil, grease). Thus, for purposes of this application, gray water should be interpreted as including any wastewater including but not limited to condensate, traditional gray water, clear water, and the like.

The vacuum pumps 15 operate to reduce the pressure within the pipes, the reservoirs 20, 25, and the knockdown tank 30 to a vacuum pressure. Thus, the vacuum pumps 15 define a vacuum portion of the system that is generally maintained at a vacuum pressure. Before proceeding, it should be noted that the term "vacuum pressure" refers to a pressure below atmospheric pressure but does not require an absolute vacuum. As such, a pressure of 7 psia would be a vacuum pressure.

The illustrated construction includes three vacuum pumps 15. These pumps 15 can be arranged to run concurrently or to run individually as needed to maintain the desired vacuum. In other constructions, more pumps 15 or fewer pumps 15 are employed as desired. Each pump 15 also includes a check valve 40 to inhibit reverse flow into the evacuated areas and an isolation valve 45 that allows the pump 15 to be disconnected from the evacuated portion without disabling the entire vacuum system.

The gray water reservoir 25 includes two gray water collection tanks 50. Other constructions may employ a single tank 50 or more than two tanks 50 as desired. The use of two or more tanks 50 allows one tank 50 to be taken out of service (e.g., for cleaning or maintenance), while the other tank 50 is used, thus reducing the down time of the system. Each tank 50 includes a drain line 55 connected at or near the bottom of the tank 50 to provide for the periodic removal of waste from the tanks 50. A check valve 60 is positioned within the drain line 55 to inhibit flow into the tank 50 from the drain line 55. When the tanks 50 are maintained at the vacuum pressure, the check valves 60 are held closed and no flow exits or enters the tank 50 via the drain line 55. Each tank 50 also includes a vacuum connection 65 that connects the tank 50 to the vacuum pumps 15. Generally, the vacuum connection 65 is near the top of the tank 50 to allow the vacuum pumps 15 to maintain a low-pressure space above any fluid that may be in the particular tank 50. However, other vacuum connection points may also be employed if desired. Each tank 50 further includes a gray water waste inlet 70. The gray water waste inlet 70 is generally positioned at or near the top of the tank 50 with other positions being possible. The gray water waste inlet 70 delivers gray water that has been collected from one or more waste water sources 75 (e.g., condensate, gray water, clear water, and the like), shown in FIG. 2, to the gray water reservoir 25. Thus, the gray water reservoir 25 serves as a common collection point for all of the gray water waste collected by the system.

Each gray water collection tank 50 also includes an air vent 80 that is normally maintained in the closed position by a vent valve 85. The vent valve 85 opens periodically to aid in draining the tanks 50. In addition, each tank 50 includes two isolation valves. The first isolation valve 90 is positioned between the gray water waste inlet 70 and the tank 50 and the second isolation valve 95 is positioned between the vacuum pumps 15 and the tank 50. With the isolation valves 90, 95 closed, the tank 50 can be cleaned or maintained without disabling the rest of the system.

A sensor (not shown) positioned within or adjacent the tank 50 measures a tank parameter, such as a liquid level, to trigger a drain cycle. In other constructions a pressure sensor or other sensor may be employed to initiate a drain cycle. During the drain cycle, the vent valve 85 opens to return the tank interior pressure to atmospheric pressure. Once the pressure within the tank 50 reaches atmospheric pressure, the check valve 60 in the drain line 55 opens and gravity drains the contents of the tanks 50. Generally, gray water can be drained directly into a sewer or septic system with no additional treatment. Thus, the drain line 55 typically connects to a sewer or septic system.

The FOG-laden water reservoir 20 is similar to the gray water reservoir 25. The FOG-laden water reservoir 20 includes two FOG-laden water collection tanks 100 with more or fewer tanks 100 also being suited for use. FOG-laden water enters the tanks 100 near the top of each tank 100 via a FOG-laden water waste inlet 105. In addition, the vacuum portion of the system connects to the top of each FOG-laden water tank 100 at a vacuum connection 110 such that the vacuum pumps 15 are able to maintain a vacuum pressure within each tank 100. An air vent 115 is also positioned near the top of the tank 100 and is controlled by a vent valve 120. Each tank 100 also includes isolation valves 125 that allow the tank 100 to be separated from the system for cleaning or maintenance without disabling the system.

Each FOG-laden water tank 100 includes a drain line 130 that extends from the bottom of the tank 100. A check valve 135 is disposed within the drain line 130 to inhibit flow from the drain line 130 into the tank 100. The check valve 135 remains in the closed position so long as the pressure within the tank 100 remains sufficiently lower than the pressure within the drain line 130, which is usually atmospheric pressure.

A sensor (not shown) positioned within or adjacent each of the FOG-laden water tanks 100 measures a tank parameter, such as liquid level, to trigger a drain cycle. In other constructions a pressure sensor or other sensor may be employed to initiate a drain cycle. During the drain cycle, the vent valve 120 opens to return the tank interior pressure to atmospheric pressure. Once the pressure within the tank 100 reaches atmospheric pressure, the check valve 135 in the drain line 130 opens and gravity drains the contents of the tanks 100. The FOG-laden water drains to the grease filter or interceptor 35 (FIG. 4) where a substantial portion of the FOG is separated from the water. The water is then directed into a sewer or septic system with no additional treatment. The grease interceptor 35 is periodically cleaned and the FOG removed.

Alternatively, the tanks 50, 100 may be drained by manually actuating or manually opening the vent valve 85, 120. Manual operation would allow for the immediate removal of waste by the user if desired.

Each of the gray water tanks 50 and the FOG-laden water tanks 100 may also include a chemical injection port 140, a hot water injection port 145, and an inspection aperture 150 (shown in FIG. 1). Hot water or chemicals could be injected into the tank 50, 100 through their respective ports 145, 150 to facilitate draining, or to clean the tank 50, 100. The inspection aperture 150 allows for a visual inspection of the interior of the tank 50, 100 during system operation with the tank 50, 100 out of service.

Figure 4:
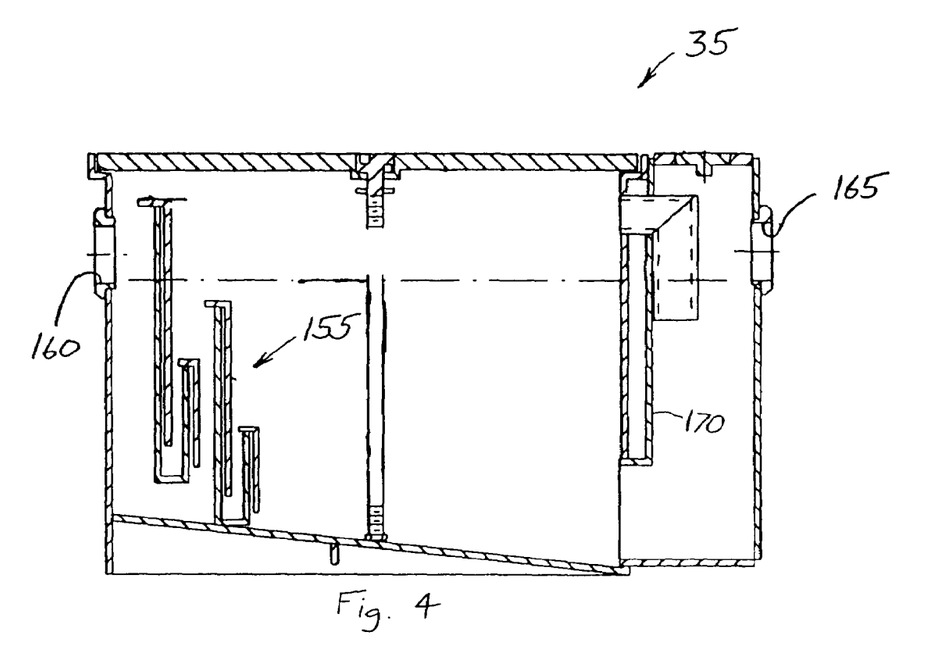
FIG. 4 is a sectional view of a grease interceptor.

FIG. 4 illustrates one possible construction of the grease interceptor 35. The interceptor 35 includes a plurality of baffles 155 that direct the fluid along a circuitous path between an inlet 160 and an outlet 165. One baffle 170 is positioned such that liquid must pass under the baffle 170 to reach the outlet 165. FOG generally floats on top of liquid water and as such cannot pass beneath this final baffle 170. Thus, the FOG is trapped within the interceptor 35. The top of the interceptor 35 is periodically removed to allow for the removal of the collected FOG. The Jay R. Smith Mfg. Co. of Montgomery, Ala. manufactures grease interceptors of the type described herein.

With reference to FIG. 1, the knockdown tank 30 may be positioned between the gray water reservoir 35 and the FOG-laden water reservoir 20 to inhibit the transfer of FOG particulate from the FOG-laden water reservoir 20 to the gray water reservoir 25. The knockdown tank 30 provides a large volume that reduces the flow velocity of the fluid moving through the tank 30. The reduced velocity allows time for heavier particles (such as FOG, dirt, dust, and the like) to settle out of the fluid stream. In some systems, the knockdown tank 30 may be unnecessary. In still other constructions, baffles or other flow directing devices may be required to further reduce carry-over.

Figure 2:
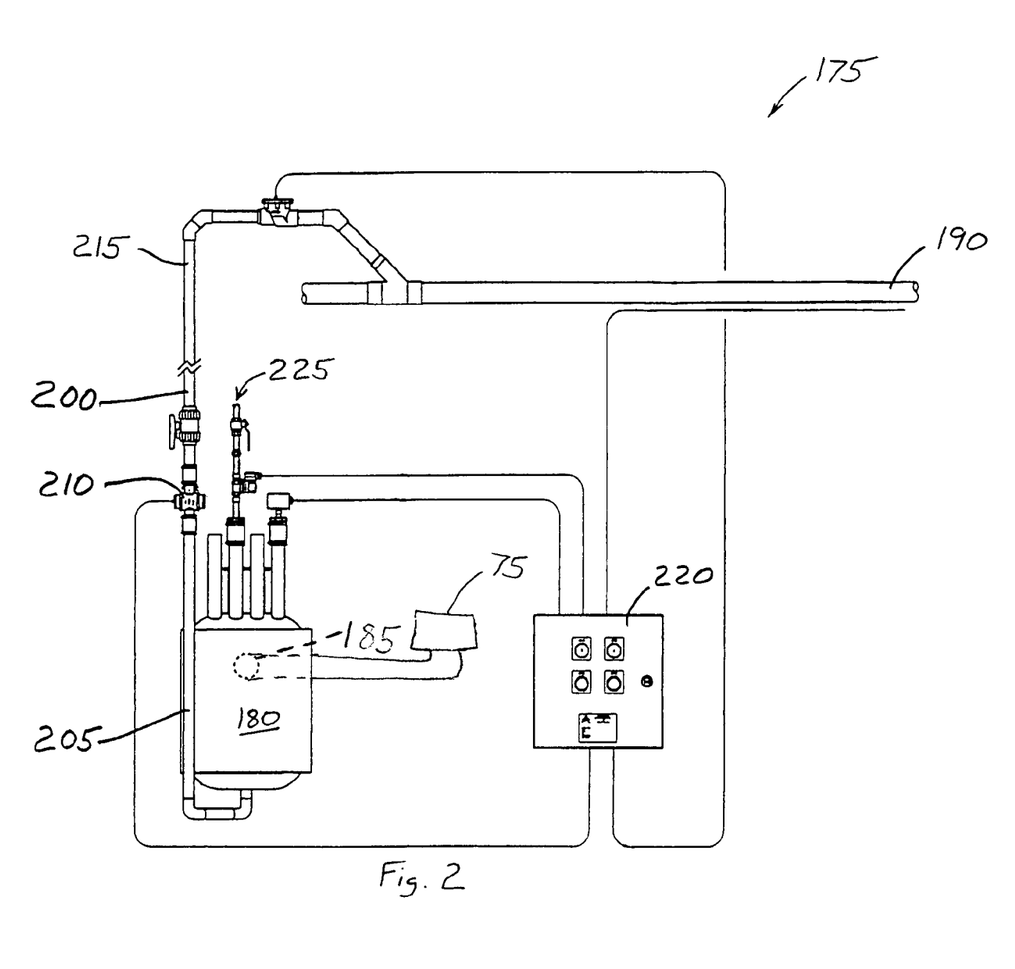
FIG. 2 is a side view of another portion of a vacuum drainage system including a FOG-laden water accumulator.

Turning to FIG. 2, a collection portion 175 of the vacuum system is illustrated. The collection portion 175 of the vacuum system collects waste from one or more sources and directs the waste to one of the wastewater inlets 70, 105 (shown in FIG. 1). Before describing FIG. 2 in detail, it should be noted that FIG. 2 illustrates only a single collection portion 175 of the vacuum system. The collection portion 175 could collect either gray water or FOG-laden water. A typical system may include many such collection portions 175 to collect waste from multiple sources. For example, a typical application may include three or more sources of gray water and three additional sources (separate from the gray water sources) of FOG-laden water. Each of these sources would typically include a collection portion 175 similar to that of FIG. 2.

Each collection portion 175 includes an accumulator 180 that is in fluid communication with the source of waste 75 (a gray water source in this example) via a drain pipe 185. Waste from the source 75 flows under the influence of gravity to the accumulator 180 where it collects. The accumulator 180 provides a small storage area (when compared to the collection tanks 50, 100) for waste. The accumulators 180 allow for the collection of a predetermined amount of waste and a longer duration between vacuum applications.

The collection portion 175 includes a pipe 190 that connects the collection portion 175 to the storage portion 10. The pipe 190 connects to pipe 195a (FIG. 1) if the waste being piped is gray water waste and to pipe 195b (FIG. 1) if the waste being piped is FOG-laden waste. The collection portion 175 of FIG. 2 connects to pipe 195a as the source 75 is described as being a gray water source.

A riser 200 interconnects the accumulator 180 and the storage portion 10 of the system (shown in FIG. 1) that is subjected to the partial vacuum. The riser 200 includes a first portion 205 attached to the accumulator 180 and a riser valve 210. The riser valve 210 separates the first portion 205 from a second portion 215. The second portion 215 is in fluid communication with the storage portion 10 and as such is subjected to the vacuum pressure. Thus, the riser valve 210 separates a vacuum portion of the piping from the accumulator 180.

The riser 200 is a substantially vertical pipe arrangement. However, it should be understood that there is no requirement that the riser 200 be oriented vertically or that the riser 200 actually change in elevation. The riser length and orientation is largely a function of the location of the accumulator 180 relative to the collection tank 50, 100, and is only limited in vertical length by the physical inability to lift fluid over a certain vertical height using a vacuum.

The position of the riser valve 210 relative to the accumulator 180 can effect system operation. In some constructions, the riser valve 210 is located no more than about four feet above the elevation of the accumulator 180. In still other constructions, the riser valve 210 is positioned in the horizontal run of pipe above the accumulator. However, it should be understood that many other factors (e.g., pipe diameter, piping arrangement, vacuum pressure, atmospheric pressure, etc.) can effect system performance and will allow systems to function with riser valves 210 located at elevations greater than four feet above the accumulator 180 or in other positions not discussed herein.

A controller 220 operates the riser valve 210 to facilitate the removal of the waste collected within the accumulator 180. The controller 220 senses a pressure, a liquid level, or another parameter indicative of the amount of liquid within the accumulator 180 and actuates the valve 210 in response to the sensed parameter. For example, the controller 220 may directly measure liquid level and may open the valve 210 when the accumulator 180 is half full of liquid. Alternatively, the controller 220 may allow for the manual opening and/or closing of the riser valve 210. Manual operation would allow for the immediate removal of waste by the user if desired.

When the riser valve 210 opens, the first portion of the riser 205 and the bottom of the accumulator 180 are exposed to vacuum pressure. The vacuum draws the waste out of the accumulator 180, up the riser 200, and eventually into the waste inlet 70 or 105 (shown in FIG. 1). Generally, the riser valve 210 will remain open until all of the waste has been extracted from the accumulator 180. Once the waste is removed, the vacuum may draw a quantity of air from the source.

The accumulator 180 may also include a water and/or a chemical injection port 225 that facilitates the injection of hot water and/or other chemicals respectively. The hot water or chemicals can be used to clean the accumulator 180 or pre-treat the waste to make for easier handling.

Figure 3:
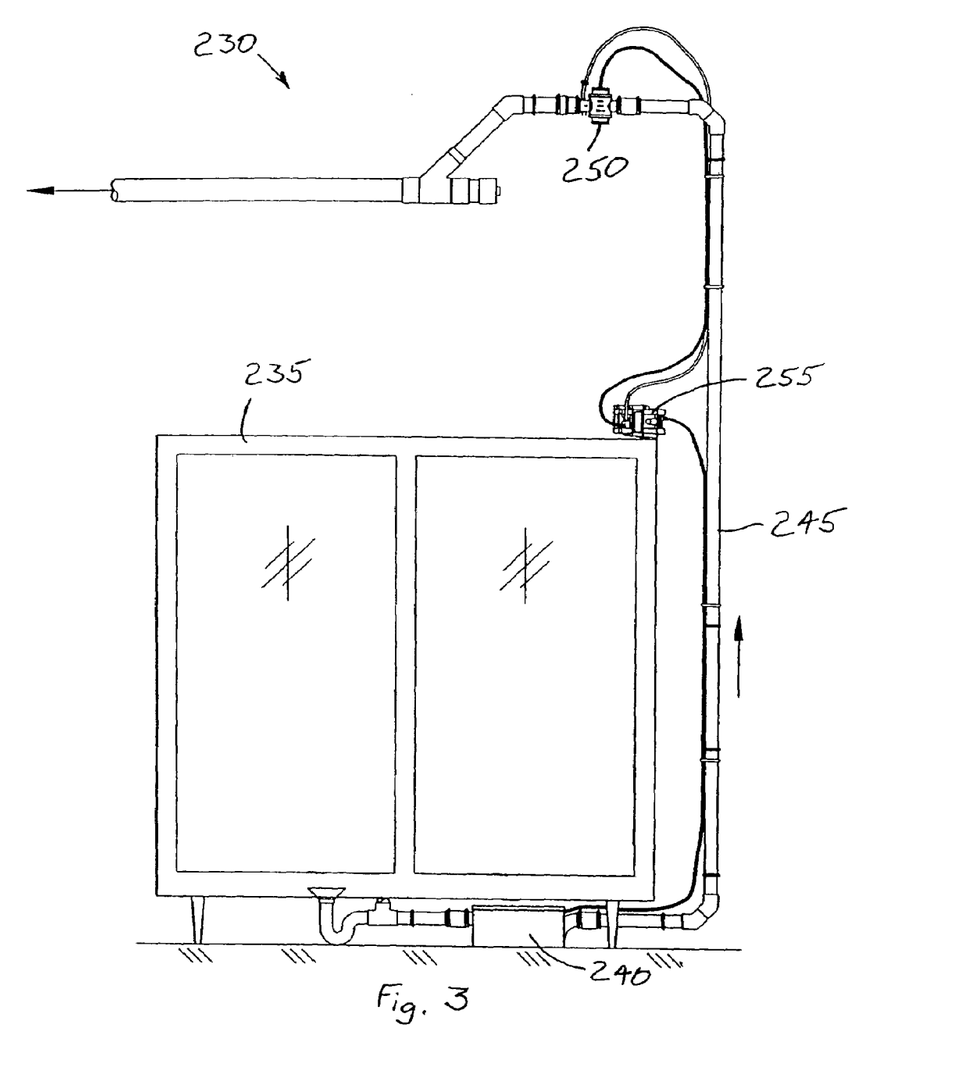
FIG. 3 is a side view of another portion of the vacuum drainage system including a condensate accumulator.

FIG. 3 illustrates another construction of a collection portion 230 that is well suited to collecting condensate. Condensate typically forms in cooled areas such as freezer cases 235 when moisture in warm humid air condenses and freezes on cooling components, doors, shelves, and other components within the refrigerated case 235. Periodically, the refrigerated case 235 is defrosted and the condensed water drained. The condensed water can be treated as gray water and collected within the gray water system. Alternatively, a third grade of wastewater is collected in a third set of collection tanks using a system similar to that described for collecting gray water and FOG-laden water.

The collection portion 230 includes an accumulator 240, a riser 245, and an extraction valve 250. The accumulator 240 is positioned beneath the case 235 to collect the condensate, which is directed to the accumulator 240 via gravity. A controller 255 opens the extraction valve 250 when the liquid level within the accumulator 240 reaches a predetermined level. With the extraction valve 250 open, the accumulator 240 is exposed to vacuum pressure and the liquid within the accumulator 240 is drawn into the collection portion 10 as has been described.

With reference to FIGS. 1 and 2, the operation of the vacuum system will now be described. Both gray water waste as well as FOG-laden waste is generated through the normal day-to-day operations within a facility. FIG. 2 illustrates one accumulator 180 that collects one of these types of waste. The waste drains into the accumulator 180 (with gravity as the motive force) to increase the waste level within the accumulator 180. Once the waste level reaches a predetermined elevation, the controller 220 opens the riser valve 210 to expose the accumulator 180 to vacuum pressure. The vacuum pressure draws the waste up the riser 200 and into the FOG-laden water waste inlet 105. In some situations hot water or another chemical (e.g., biological compound, detergent, grease remediator, and the like) is injected into the accumulator 180 as the waste is drawn up the riser 200 to assure a complete discharge and cleaning of the accumulator 180. In still other constructions, a heater (not shown) is activated to heat the contents of the accumulator 180 to make extraction easier. Suitable heaters include wrap-around jacket type heaters as well as submersible heaters.

The vacuum draws the gray water within the gray water waste inlet 70 into one of the tanks 50 of the gray water reservoir 25 where it collects. Similarly, the vacuum draws the FOG-laden water into one of the two tanks 100 of the FOG-laden water reservoir 20. When the gray water tanks 50 reach a predetermined level (e.g., half full), a sensor signals the controller that the tank 50 needs to be drained. To drain the tank 50, the isolation valve 95 between the vacuum pumps 15 and the tank 50 is closed and the air vent valve 85 is opened to allow the tank pressure to increase to atmospheric pressure. Once the pressure is high enough, gravity drains the liquid from the tank 50 to the sewer or septic system. Again, hot water or chemicals can be injected, or heat can be applied to the tank 50, to assure a complete discharge of the tank 50 and a clean tank interior. Once the discharge is complete, the air vent valve 85 is closed and the isolation valves 95 are opened to again expose the tank interior to vacuum pressure. The air within the tank 50 is pumped from the system by the vacuum pumps 15.

The FOG-laden water follows a similar route as the gray water. However, rather than draining to a sewer or septic system, the FOG-laden water drains to the grease interceptor 35. The grease interceptor 35 separates the FOG from the water before discharging the water to the sewer or septic system. The FOG remains in the interceptor 35 until it is cleaned.

During the air removal step, it is possible for FOG particles to be drawn into the vacuum system. If this occurs, the knockdown tank 30 may be needed. The knockdown tank 30 is positioned in the vacuum line between the vacuum pumps 15 and the FOG tanks 100. The knockdown tanks 30 provide a large volume, which reduces the airflow velocity to allow particles to settle out of the air stream. This effectively inhibits the transfer of FOG-laden waste into the air or the gray water portions of the system 10.

Although the invention has been described in detail with reference to certain preferred embodiments, variations and modifications exist within the scope and spirit of the invention as described and defined in the following claims.

What is claimed is:

1. A vacuum transport system suited to moving FOG-laden water, the system comprising:
    a first reservoir including a first outlet arranged to drain the first reservoir in response to a first pressure within the first reservoir that is about equal to atmospheric pressure;
    a second reservoir including a second outlet arranged to drain the second reservoir in response to a second pressure within the second reservoir that is about equal to atmospheric pressure;
    at least one vacuum pump in fluid communication with the first reservoir and the second reservoir and operable to produce a vacuum within the first reservoir and the second reservoir;
    a first accumulator positioned to collect FOG-laden water from a first FOG-laden water source;
    a second accumulator positioned to collect waste water from a first waste water source, the first waste water source different from the first FOG-laden water source;
    a first valve operable to selectively provide fluid communication between the first accumulator and the first reservoir; and
    a second valve operable to selectively provide fluid communication between the second accumulator and the second reservoir, wherein the first reservoir and the second reservoir are arranged to inhibit the flow of FOG-laden water to the second reservoir.

2. The vacuum transport system of claim 1, wherein each of the first reservoir and the second reservoir includes at least two tanks.

3. The vacuum transport system of claim 1, further comprising a third accumulator positioned to collect FOG-laden water from a second FOG-laden water source, the third accumulator in selective fluid communication with the first reservoir.

4. The vacuum transport system of claim 1, further comprising a fourth accumulator positioned to collect waste water from a second waste water source, the fourth accumulator in selective fluid communication with the second reservoir.

5. The vacuum transport system of claim 1, further comprising a grease interceptor in fluid communication with the first reservoir, the grease intercept operable to separate a substantial portion of the FOG from the FOG-laden water.

6. The vacuum transport system of claim 5, wherein the first reservoir is disposed within a building and the grease interceptor is disposed substantially outside of the building.

7. The vacuum transport system of claim 1, further comprising a spray system operable to spray a chemical into at least one of the first reservoir and the second reservoir.

8. The vacuum transport system of claim 7, wherein the chemical includes hot water.

9. The vacuum transport system of claim 1, further comprising a heat source positioned to heat the contents of the first reservoir.

10. The vacuum transport system of claim 1, further comprising a knock-down tank in fluid communication with the vacuum pump, the first reservoir, and the second reservoir and positioned to inhibit the flow of FOG-laden water to the second reservoir.

11. A vacuum transport system suited to moving FOG-laden water and gray waste water, the system comprising:
    a vacuum system;
    a first reservoir coupled to the vacuum system, the first reservoir operable in response to a vacuum pressure to draw FOG-laden water into the first reservoir and operable in response to a non-vacuum pressure to gravitationally drain the contents of the first reservoir;
    a second reservoir coupled to the vacuum system, the second reservoir operable in response to a vacuum pressure to draw gray water into the second reservoir and operable in response to a non-vacuum pressure to gravitationally drain the contents of the second reservoir, the second reservoir arranged to inhibit the transport of FOG-laden water to the second reservoir.

12. The vacuum transport system of claim 11, wherein the FOG-laden water transport system includes:
- a first reservoir positioned within the FOG-laden water transport system;
- a first accumulator positioned within the FOG-laden water transport system and operable to collect FOG-laden water from a first FOG-laden water source;
- a first valve operable to selectively provide fluid communication between the first accumulator and the first reservoir; and
- a first drain pipe operable to drain the first reservoir to a FOG-laden water filtration system.

13. The vacuum transport system of claim 11, wherein the grey water transport system includes:
- a second reservoir positioned within the grey water transport system;
- a second accumulator positioned within the grey water transport system and operable to collect grey water from a first grey water source;
- a second valve operable to selectively provide fluid communication between the second accumulator and the second reservoir; and
- a second drain pipe operable to drain the second reservoir to a sewer or a septic system.

14. The vacuum transport system of claim 11, further comprising a transport tube operable to selectively transport substantially FOG-free water from the FOG-laden water transport system to the grey water transport system for further preparation and drainage.

15. The vacuum transport system suited to moving FOG-laden water and another waste water of claim 14 wherein, the transport tube contains a knock-down tank in fluid communication with the vacuum system, the FOG-laden water transport system, and the grey water transport system and positioned to inhibit the flow of FOG-laden water to the grey water transport system.

* * * * *